United States Patent
Amihood et al.

(10) Patent No.: US 12,510,627 B2
(45) Date of Patent: Dec. 30, 2025

(54) DISTRIBUTED RADAR SYSTEM

(71) Applicant: Google LLC, Mountain View, CA (US)

(72) Inventors: Patrick M. Amihood, Palo Alto, CA (US); Octavio Ponce Madrigal, Mountain View, CA (US); Cody Blair Wortham, San Francisco, CA (US)

(73) Assignee: Google LLC, Mountain View, CA (US)

( * ) Notice: Subject to any disclaimer, the term of this patent is extended or adjusted under 35 U.S.C. 154(b) by 398 days.

(21) Appl. No.: 18/010,861

(22) PCT Filed: Jun. 15, 2021

(86) PCT No.: PCT/US2021/037396
§ 371 (c)(1),
(2) Date: Dec. 16, 2022

(87) PCT Pub. No.: WO2021/257541
PCT Pub. Date: Dec. 23, 2021

(65) Prior Publication Data
US 2023/0228842 A1    Jul. 20, 2023

Related U.S. Application Data

(60) Provisional application No. 63/040,342, filed on Jun. 17, 2020.

(51) Int. Cl.
*G01S 7/41*    (2006.01)
*G01S 7/03*    (2006.01)
(Continued)

(52) U.S. Cl.
CPC .............. *G01S 7/03* (2013.01); *G01S 7/415* (2013.01); *G01S 13/003* (2013.01); *G06F 3/017* (2013.01)

(58) Field of Classification Search
CPC .......... G01S 7/03; G01S 7/415; G01S 13/003; G06F 3/017
See application file for complete search history.

(56) References Cited

U.S. PATENT DOCUMENTS

2011/0181510 A1    7/2011  Hakala et al.
2017/0176583 A1    6/2017  Gulden et al.
(Continued)

FOREIGN PATENT DOCUMENTS

CN    112558057 A  *  3/2021  ............. G01S 13/32
CN    112567256 A  *  3/2021  ............. G06V 40/28
(Continued)

OTHER PUBLICATIONS

"International Preliminary Report on Patentability", Application No. PCT/US2021/037396, Dec. 13, 2022, 7 pages.
(Continued)

*Primary Examiner* — Vladimir Magloire
*Assistant Examiner* — Kimberly Jenkins
(74) *Attorney, Agent, or Firm* — Colby Nipper PLLC

(57) ABSTRACT

Techniques and apparatuses are described that implement a distributed radar system. The distributed radar system includes two or more radar front-end circuits and at least one processor. The radar front-end circuits are distributed within a device at different positions. By partitioning antennas and transceivers across multiple radar front-end circuits instead of consolidating into a single integrated circuit, individual radar front-end circuits can have a smaller footprint than the single integrated circuit. This smaller footprint enables the radar front-end circuits to be integrated within space-constrained devices. The smaller footprint also provides additional flexibility in positioning the radar front-end circuits away from other components within the device that can (Continued)

cause interference. This can reduce the amount of interference seen by the distributed radar system.

20 Claims, 9 Drawing Sheets

(51) Int. Cl.
*G01S 13/00* (2006.01)
*G01S 13/87* (2006.01)
*G06F 3/01* (2006.01)

(56) References Cited

U.S. PATENT DOCUMENTS

| | | |
|---|---|---|
| 2018/0180713 A1 | 6/2018 | Cohen et al. |
| 2018/0210067 A1 | 7/2018 | Bilik et al. |
| 2019/0041494 A1 | 2/2019 | Roger et al. |
| 2019/0302228 A1* | 10/2019 | Ling .................... G01S 13/876 |
| 2020/0064445 A1 | 2/2020 | Amihood et al. |
| 2021/0096217 A1* | 4/2021 | Jadidian .................. G01S 13/30 |
| 2021/0239788 A1* | 8/2021 | Arage .................... G01S 7/032 |
| 2023/0417869 A1* | 12/2023 | Svendsen ................. H04B 1/40 |

FOREIGN PATENT DOCUMENTS

| | | | |
|---|---|---|---|
| EP | 4158727 A1 * | 4/2023 | ........... G01S 13/003 |
| WO | 2019035851 A1 | 2/2019 | |
| WO | 2021257541 | 12/2021 | |

OTHER PUBLICATIONS

"International Search Report and Written Opinion", Application No. PCT/US2021/037396, Oct. 1, 2021, 9 pages.

"Foreign Office Action", EP Application No. 21739216.6, Jul. 11, 2025, 5 pages.

* cited by examiner

DISTRIBUTED RADAR SYSTEM

BACKGROUND

Radars are useful devices that can detect objects. Relative to other types of sensors, like a camera, a radar can provide improved performance in the presence of different environmental conditions, such as low lighting and fog, or with moving or overlapping objects. Radar can also detect objects through one or more occlusions, such as a purse or a pocket. While there are many advantages to using radar, there are also many challenges associated with integrating radar in consumer devices.

Some challenges include size and layout constraints of the consumer device. These constraints can place restrictions on a radar's design. An example restriction can limit the quantity of antennas to decrease a footprint of the radar. The use of fewer antennas, however, can decrease the radar's sensitivity (e.g., ability to detect small objects or objects at far ranges) and angular resolution. Space constraints can also limit where the radar can be placed relative to other components within the electronic device. In some cases, these components generate interference, which can increase the radar system's false alarm rate.

SUMMARY

Techniques and apparatuses are described that implement a distributed radar system within a device. The distributed radar system includes two or more radar front-end circuits and at least one processor. The radar front-end circuits are distributed within the device at different positions. Each radar front-end circuit includes at least one antenna and at least one transceiver. At least a portion of an antenna pattern of a first radar front-end circuit overlaps an antenna pattern of a second radar front-end circuit. By partitioning the antennas and transceivers across multiple radar front-end circuits instead of consolidating into a single integrated circuit, individual radar front-end circuits can have a smaller footprint than the single integrated circuit. This smaller footprint enables the radar front-end circuits to be integrated within space-constrained devices, which are more likely to have multiple smaller spaces available than a single large space. The smaller footprint also provides additional flexibility in positioning the radar front-end circuits away from other components within the device that can cause interference. This can reduce the amount of interference seen by the distributed radar system.

The processor is coupled to the radar front-end circuits and combines radar data that is generated by these radar front-end circuits in a non-coherent or coherent manner. Additionally, the processor implements a radar data combiner, which can compensate for differences in performance, position, or phase across the radar front-end circuits. In this way, the radar data combiner can increase a signal-to-noise ratio of the distributed radar system to enable the distributed radar system to achieve a similar detection range and volume coverage as a non-distributed radar system that is implemented on a single integrated circuit. This also enables the distributed radar system to realize higher angular resolution and sensitivity compared to implementing a radar system with a single radar front-end circuit. By combining radar data from multiple radar front-end circuits, the distributed radar system can achieve a target performance within space-constrained devices.

Aspects described below include an apparatus includes a distributed radar system. The distributed radar system includes two or more front-end circuits and at least one processor. Each radar front-end circuit of the two or more radar front-end circuits includes at least one antenna and at least one transceiver coupled to the at least one antenna. The at least one processor is coupled to the two or more radar front-end circuits.

Aspects described below also include a method of operating a distributed radar system. The method includes transmitting and receiving first radar signals using a first radar front-end circuit of the distributed radar system. The first radar signals reflect off a person performing a gesture. The method also includes generating first radar data based on the first radar signals and passing the first radar data from the first radar front-end circuit to a processor of the distributed radar system. The method additional includes transmitting and receiving second radar signals using a second radar front-end circuit of the distributed radar system. The second radar signals reflect off the person performing the gesture. The method further includes generating second radar data based on the second radar signals and passing the second radar data from the second radar front-end circuit to the processor. The method also includes recognizing, using the processor, the gesture performed by the person based on the first radar data and the second radar data.

Aspects described below include a computer-readable storage media comprising computer-executable instructions that, responsive to execution by a processor, cause the distributed radar system to perform any one of the described methods.

Aspects described below also include a system with means for implementing a distributed radar system.

BRIEF DESCRIPTION OF THE DRAWINGS

Apparatuses for and techniques implementing a distributed radar system are described with reference to the following drawings. The same numbers are used throughout the drawings to reference like features and components:

FIG. 4-1 illustrates example positions of a distributed radar system's radar front-end circuits on a smartphone;

FIG. 4-2 illustrates example overlapping coverage of a distributed radar system's radar front-end circuits on a smartphone;

DETAILED DESCRIPTION

Overview

Figure 1:
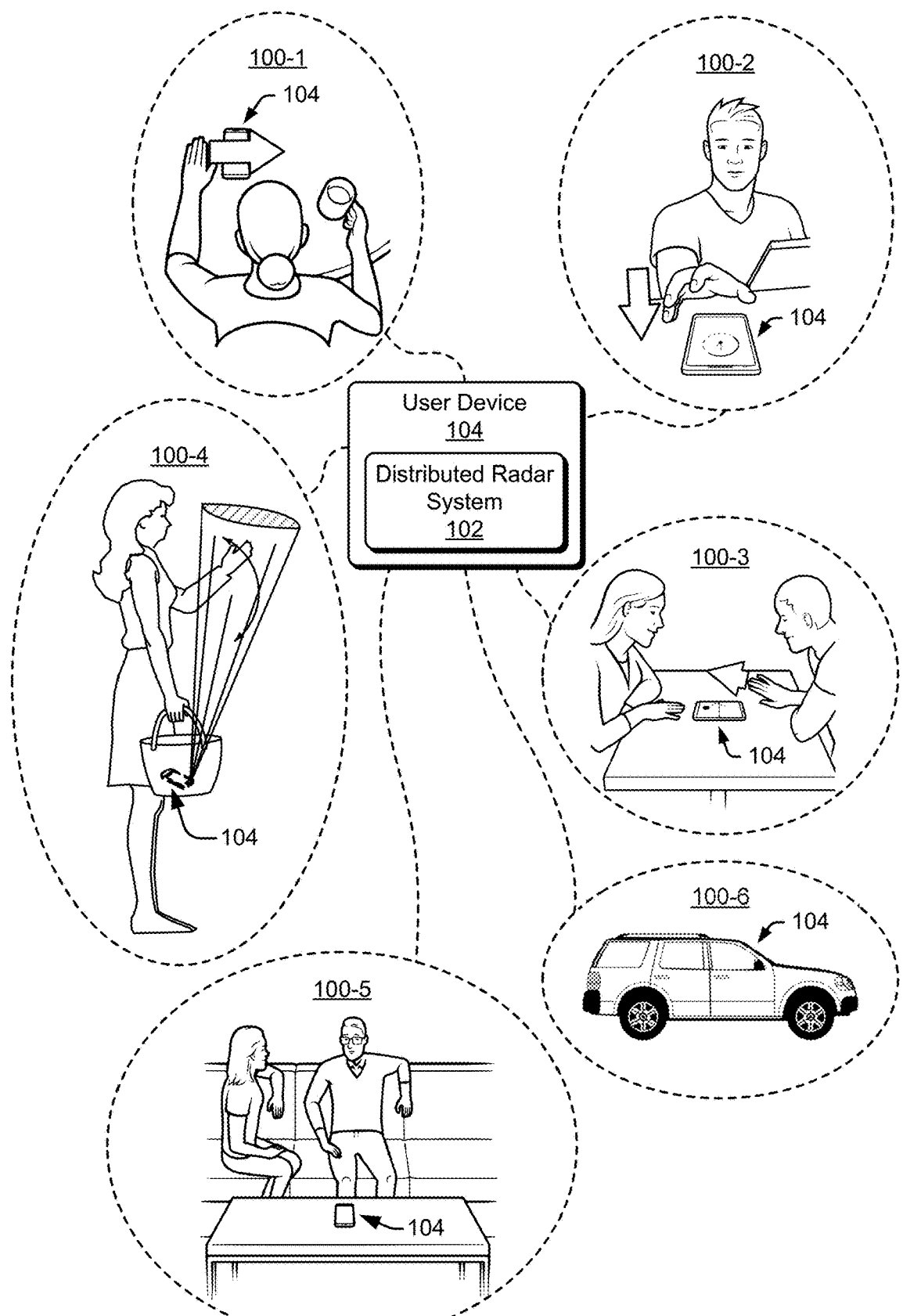
FIG. 1 illustrates example environments in which a distributed radar system of a user device can operate.

Integrating a radar system within a consumer device can be challenging. One such challenge involves size or layout constraints of the consumer device. To fit within an available space of the consumer device, a radar system can be implemented with fewer antennas to decrease the radar system's footprint. The use of fewer antennas, however, can decrease the radar system's sensitivity (e.g., ability to detect small objects or objects at far ranges) and angular resolution.

The size or layout constraints can also limit where the radar system can be placed relative to other components within the consumer device. In some cases, these components generate interference, which can be detected by the radar system. This interference can include, for instance, vibrations caused by an audible sound produced by a speaker of the consumer device or a wireless communication signal transmitted by a wireless transceiver of the consumer device.

To address these challenges, this document describes techniques and devices that implement a distributed radar system within a device. The distributed radar system includes two or more radar front-end circuits and at least one processor. The radar front-end circuits are distributed within the device at different positions. Each radar front-end circuit includes at least one antenna and at least one transceiver. At least a portion of an antenna pattern of a first radar front-end circuit overlaps an antenna pattern of a second radar front-end circuit. By partitioning the antennas and transceivers across multiple radar front-end circuits instead of consolidating into a single integrated circuit, individual radar front-end circuits can have a smaller footprint than the single integrated circuit. This smaller footprint enables the radar front-end circuits to be integrated within space-constrained devices, which are more likely to have multiple smaller spaces available than a single large space. The smaller footprint also provides additional flexibility in positioning the radar front-end circuits away from other components within the device that can cause interference. This can reduce the amount of interference seen by the distributed radar system.

The processor is coupled to the radar front-end circuits and combines radar data that is generated by these radar front-end circuits in a non-coherent or coherent manner. Additionally, the processor implements a radar data combiner, which can compensate for differences in performance, position, or phase across the radar front-end circuits. In this way, the radar data combiner can increase a signal-to-noise ratio of the distributed radar system to enable the distributed radar system to achieve a similar detection range and volume coverage as a non-distributed radar system that is implemented on a single integrated circuit. This also enables the distributed radar system to realize higher angular resolution and sensitivity compared to implementing a radar system with a single radar front-end circuit. By combining radar data from multiple radar front-end circuits, the distributed radar system can achieve a target performance within space-constrained devices.

Example Environment

FIG. 1 is an illustration of example environments 100-1 to 100-6 in which techniques using, and an apparatus including, a distributed radar system 102 may be embodied. In the depicted environments 100-1 to 100-6, the distributed radar system 102 of a user device 104 is capable of detecting one or more objects (e.g., users). The user device 104 is shown to be a smartphone in environments 100-1 to 100-5 and a smart vehicle in the environment 100-6. In general, the user device 104 may, e.g., be a user device comprising a computer processor and computer-readable medium.

In the environments 100-1 to 100-4, a user performs different types of gestures, which are detected by the distributed radar system 102. In some cases, the user performs a gesture using an appendage or body part. Alternatively, the user can also perform a gesture using a stylus, a hand-held object, a ring, or any type of material that can reflect radar signals.

In environment 100-1, the user makes a scrolling gesture by moving a hand above the user device 104 along a horizontal dimension (e.g., from a left side of the user device 104 to a right side of the user device 104). In the environment 100-2, the user makes a reaching gesture, which decreases a distance between the user device 104 and the user's hand. The users in environment 100-3 make hand gestures to play a game on the user device 104. In one instance, a user makes a pushing gesture by moving a hand above the user device 104 along a vertical dimension (e.g., from a bottom side of the user device 104 to a top side of the user device 104). In the environment 100-4, the user device 104 is stored within a purse, and the distributed radar system 102 provides occluded-gesture recognition by detecting gestures that are occluded by the purse.

The distributed radar system 102 can also recognize other types of gestures or motions not shown in FIG. 1. Example types of gestures include a knob-turning gesture in which a user curls their fingers to grip an imaginary doorknob and rotate their fingers and hand in a clockwise or counter-clockwise fashion to mimic an action of turning the imaginary doorknob. Another example type of gesture includes a spindle-twisting gesture, which a user performs by rubbing a thumb and at least one other finger together. The gestures can be two-dimensional, such as those used with touch-sensitive displays (e.g., a two-finger pinch, a two-finger spread, or a tap). The gestures can also be three-dimensional, such as many sign-language gestures, e.g., those of American Sign Language (ASL) and other sign languages worldwide. Upon detecting each of these gestures, the user device 104 can perform an action, such as display new content, move a cursor, activate one or more sensors, open an application, and so forth. In this way, the distributed radar system 102 provides touch-free control of the user device 104.

In the environment 100-5, the distributed radar system 102 generates a three-dimensional map of a surrounding environment for contextual awareness. The distributed radar system 102 also detects and tracks multiple users to enable both users to interact with the user device 104. The distributed radar system 102 can also perform vital-sign detection. In the environment 100-6, the distributed radar system 102 monitors vital signs of a user that drives a vehicle. Example vital signs include a heart rate and a respiration rate. If the distributed radar system 102 determines that the driver is falling asleep, for instance, the distributed radar system 102 can cause the user device 104 to alert the user. Alternatively, if the distributed radar system 102 detects a life threatening emergency, such as a heart attack, the distributed radar system 102 can cause the user device 104 to alert a medical professional or emergency services. The user device 104 and the distributed radar system 102 are further described with respect to FIG. 2.

Example Distributed Radar System

Figure 2:
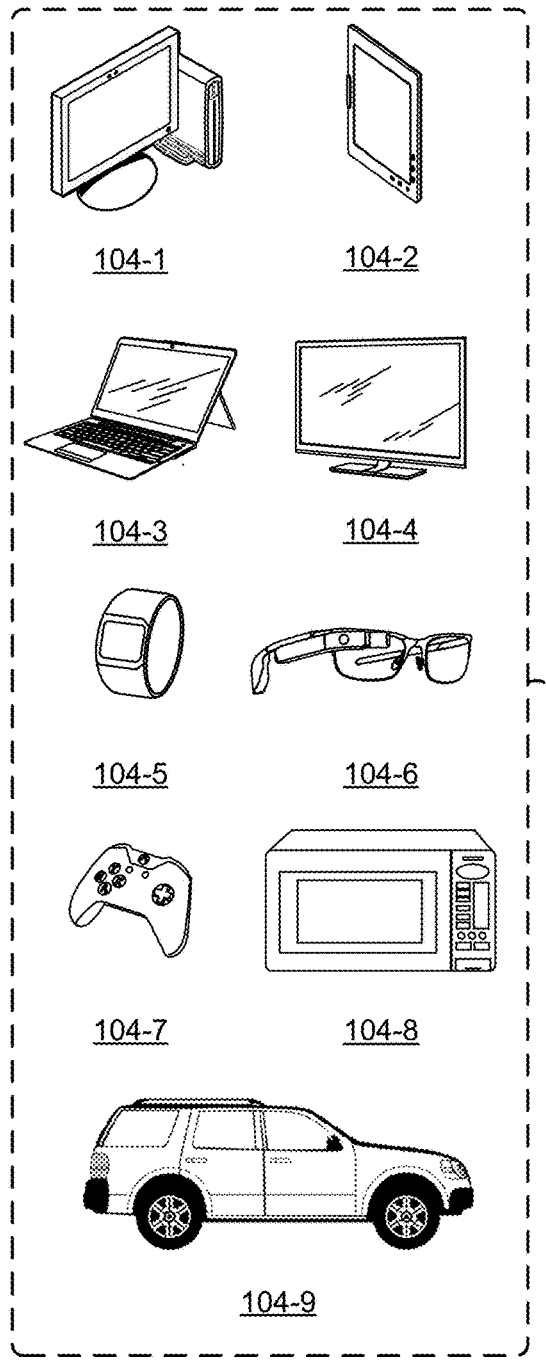
FIG. 2 illustrates an example implementation of a distributed radar system as part of a user device.
Figure 2:
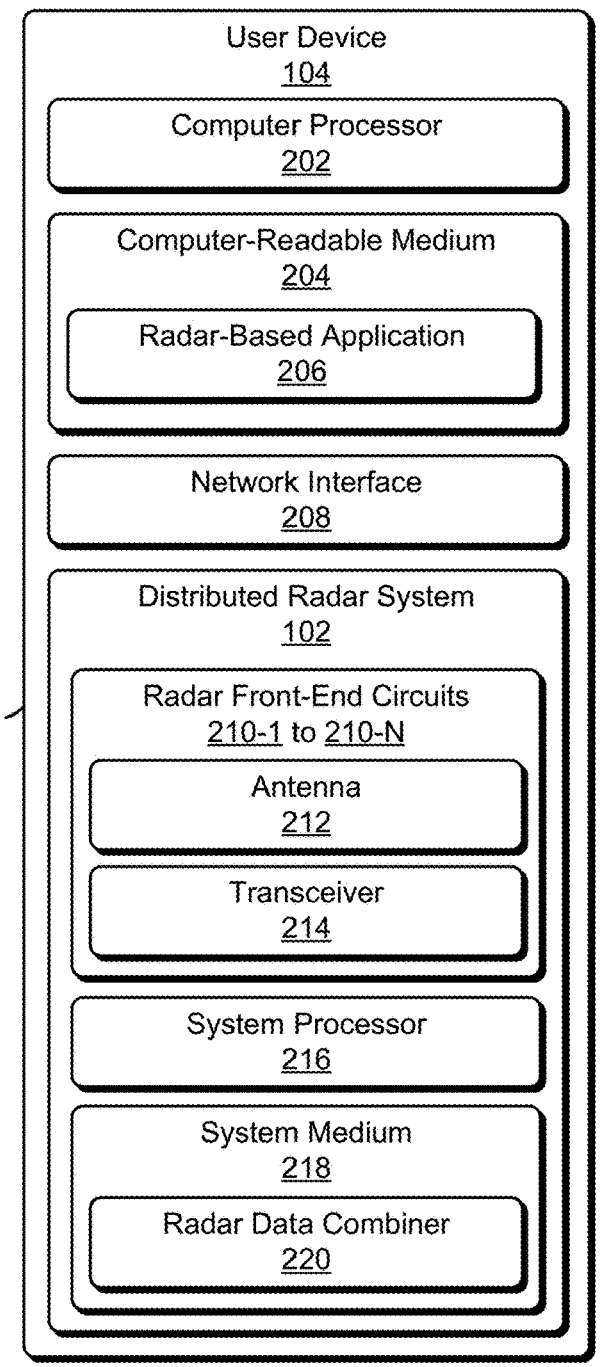

FIG. 2 illustrates the distributed radar system 102 as part of the user device 104. The user device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, such as a home service device, a smart speaker, a smart thermostat, a security camera, a baby monitor, a router, a drone, a trackpad, a drawing pad, a netbook, an e-reader, a homeautomation and control system, a wall display, and another home appliance. Note that the user device 104 can be wearable, non-wearable but mobile, or relatively immobile (e.g., desktops and appliances). The distributed radar system 102 can be used as a stand-alone distributed radar system or used with, or embedded within, many different user devices 104 or peripherals, such as in control panels that control home appliances and systems, in automobiles to control internal functions (e.g., volume, cruise control, or even driving of the car), or as an attachment to a laptop computer to control computing applications on the laptop.

The user device 104 includes one or more computer processors 202 and one or more computer-readable medium 204, which includes memory media and storage media. Applications and/or an operating system (not shown) embodied as computer-readable instructions on the computer-readable medium 204 can be executed by the computer processor 202 to provide some of the functionalities described herein. The computer-readable medium 204 also includes a radar-based application 206, which uses data generated by the distributed radar system 102 to perform a function, such as presence detection, gesture-based touch-free control, collision avoidance for autonomous driving, human vital-sign notification, and so forth.

The user device 104 can also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The user device 104 may also include a display (not shown).

The distributed radar system 102 includes two or more radar front-end circuits 210-1 to 210-N, where N represents a positive integer. The radar front-end circuits 210 are individual circuits (e.g., separate integrated circuits), which can be positioned at different positions on the user device 104 (e.g., within an interior of the user device 104 or mounted to an exterior surface of the user device 104). Each radar front-end circuit 210 can include at least one antenna 212 and at least one transceiver 214 to transmit and/or receive radar signals. In some cases, the radar front-end circuit 210 includes a single antenna 212 coupled to a single transceiver 214, which can together transmit and receive radar signals to implement a pulse-Doppler radar. In other cases, the radar front-end circuit includes at least one antenna coupled to a transmitter of the transceiver 214 and at least one other antenna coupled to a receiver of the transceiver 214 to implement a continuous-wave radar. The antenna 212 can be circularly polarized, horizontally polarized, or vertically polarized.

The radar front-end circuit 210 can include an integrated circuit, which can implement the transceiver 214 or at least a portion of the transceiver 214 associated with radio frequencies. This portion of the transceiver 214 can include components such as a power amplifier, a low-noise amplifier, a phase shifter, an acoustic filter, a mixer, and so forth. In some implementations, the integrated circuit also includes the antenna 212. In other implementations, the antenna 212 is implemented separate from the integrated circuit.

The radar front-end circuit 210 can include multiple antennas 212, which represent antenna elements of one or more antenna arrays. An antenna array enables the distributed radar system 102 to use analog or beamforming techniques during transmission and/or reception to improve the sensitivity and angular resolution of the distributed radar system 102. Consider an example in which the radar front-end circuit 210 includes an antenna 212 for transmission, and multiple antennas 212, which form receive antenna elements of an antenna array, for reception. The receive antenna elements can be positioned to form a one-dimensional shape (e.g., a line) or a two-dimensional shape (e.g., a rectangular arrangement, a triangular arrangement, or an "L" shape arrangement) for implementations that include three or more receive antenna elements. The one-dimensional shape enables the radar front-end circuit 210 to measure one angular dimension (e.g., an azimuth or an elevation) while the two-dimensional shape enables the radar front-end circuit 210 to measure two angular dimensions (e.g., both azimuth and elevation). An element spacing associated with the receive antenna elements can be less than, greater than, or equal to half a center wavelength of the radar signal.

Using the multiple radar front-end circuits 210-1 to 210-N, the distributed radar system 102 can form beams that are steered or un-steered, wide or narrow, or shaped (e.g., hemisphere, cube, fan, cone, cylinder). The steering and shaping can be achieved through analog beamforming or digital beamforming. In some implementations, at least a portion of the antennas 212 within the radar front-end circuits 210-1 to 210-N have, for instance, an un-steered omnidirectional radiation pattern or can produce a wide steerable beam to illuminate a large volume of space during transmission. To achieve target angular accuracies and angular resolutions, a remaining portion of the antennas 212 within the radar front-end circuits 210-1 to 210-N can be used to generate tens or thousands of narrow steered beams with digital beamforming during reception. In this way, the distributed radar system 102 can efficiently monitor an external environment and detect one or more users.

The transceiver 214 includes circuitry and logic for transmitting and/or receiving radar signals via the antenna 212. Components of the transceiver 214 can include amplifiers, phase shifters, mixers, switches, analog-to-digital converters, digital-to-analog converters, or filters for conditioning the radar signals. The transceiver 214 also includes logic to perform in-phase/quadrature (I/Q) operations, such as modulation or demodulation. A variety of modulations can be used, including linear frequency modulations, triangular frequency modulations, stepped frequency modulations, or phase modulations. Alternatively, the transceiver 214 can produce radar signals having a relatively constant frequency or a single tone. The transceiver 214 can be configured to support continuous-wave or pulsed radar operations.

A frequency spectrum (e.g., range of frequencies) that the transceiver 214 uses to generate the radar signals can encompass frequencies between 1 and 400 gigahertz (GHz), between 4 and 100 GHz, between 1 and 24 GHz, between 2 and 4 GHz, between 57 and 64 GHz, or at approximately 2.4 GHz. In some cases, the frequency spectrum can be divided into multiple sub-spectrums that have similar or different bandwidths. The bandwidths can be on the order of 500 megahertz (MHz), 1 GHz, 2 GHz, and so forth. Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 214 to generate multiple radar signals, which are transmitted simultaneously or separated in time. In some situations, multiple contiguous frequency sub-spectrums may be used to transmit a single radar signal, thereby enabling the radar signal to have a wide bandwidth. The radar front-end circuit 210 is further described with respect to FIG. 3.

The distributed radar system 102 also includes one or more system processors 216 and one or more system media 218 (e.g., one or more computer-readable storage media). The system medium 218 includes a radar data combiner 220, which can be implemented using hardware, software, firmware, or a combination thereof. In this example, the system processor 216 implements the radar data combiner 220, which combines radar data provided by the radar front-end circuits 210-1 to 210-N in a non-coherent or coherent manner. Prior to combining the radar data, the radar data combiner 220 can adjust the radar data to account for performance differences between the radar front-end circuits 210-1 to 210-N, interpolate the radar data to a common grid, and/or apply phase corrections to enable the radar data to be coherently combined. Although not shown, some implementations of the radar front-end circuits 210-1 to 210-N can include a processor, such as a low-power processor. In this case, a portion of the system processor 216 and/or a portion of the radar data combiner 220 can be implemented by this low-power processor. The radar data combiner 220 is further described with respect to FIG. 5.

The system processor 216 can also perform additional functions. For example, the system processor 216 can control the various radar front-end circuits 210-1 to 210-N and facilitate time synchronization so that the radar front-end circuits 210-1 to 210-N are synchronized in time. In this way, the radar front-end circuits 210-1 to 210-N can operate together and transmit similar radar signals at a particular time. In one aspect, the system processor 216 can provide a same clock signal to the radar front-end circuits 210-1 to 210-N. The system processor 216 can further analyze the combined radar data from the distributed radar front-end circuits 210-1 to 210-N to detect a user, determine a position of the user, and/or recognize a gesture performed by the user. Components of the distributed radar system 102 are further described with respect to FIGS. 3-5.

Figure 3:
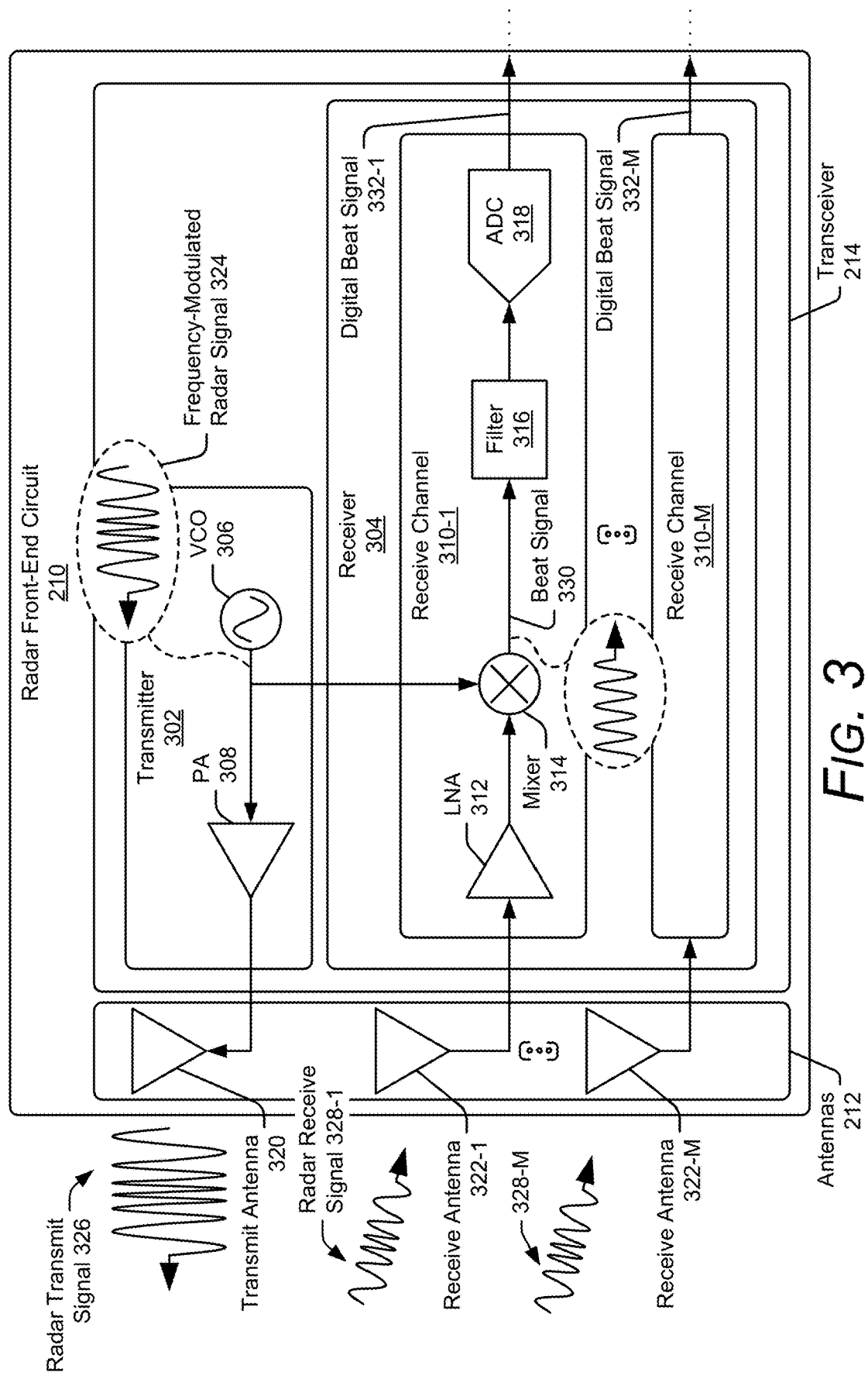
FIG. 3 illustrates an example radar front-end circuit of a distributed radar system.

FIG. 3 illustrates an example radar front-end circuit 210 of the distributed radar system 102. In the depicted configuration, the radar front-end circuit 210 implements a portion of a frequency-modulated continuous-wave radar. However, other types of radar architectures can be implemented, as described above with respect to FIG. 2. The transceiver 214 of the radar front-end circuit 210 includes at least one transmitter 302 and at least one receiver 304. The transmitter 302 includes at least one voltage-controlled oscillator 306 and at least one power amplifier (PA) 308. The receiver 304 includes one or more receive channels 310-1 to 310-M, where M is a positive integer. Each receive channel 310-1 to 310-M includes at least one low-noise amplifier (LNA) 312, at least one mixer 314, at least one filter 316, and at least one analog-to-digital converter 318.

The radar front-end circuit 210 also includes multiple antennas 212, which include at least one transmit antenna 320 and at least two receive antennas 322-1 to 322-M. The transmit antenna 320 is coupled to the transmitter 302. The receive antennas 322-1 to 322-M form an antenna array, such as a linear antenna array, and are respectively coupled to the receive channels 310-1 to 310-M. Although the radar front-end circuit 210 of FIG. 3 is shown to include multiple receive antennas 322-1 to 322-M and multiple receive channels 310-1 to 310-M, other implementations can include a single receive antenna 322 and a single receive channel 310.

During transmission, the voltage-controlled oscillator 306 generates a frequency-modulated radar signal 324 at radio frequencies. The frequency-modulated radar signal 324 can include a sequence of chirps that are transmitted in a continuous burst or as time-separated pulses. A duration of each chirp can be on the order of tens or thousands of microseconds (e.g., between approximately 40 microseconds (µs) and 5 milliseconds (ms)), for instance.

Individual frequencies of the chirps can increase or decrease over time. As an example, the radar front-end circuit 210 employs a two-slope cycle (e.g., triangular frequency modulation) to linearly increase and linearly decrease the frequencies of the chirps over time. The two-slope cycle enables the distributed radar system 102 to measure the Doppler frequency shift caused by motion of an user (or object). In general, transmission characteristics of the chirps (e.g., bandwidth, center frequency, duration, and transmit power) can be tailored to achieve a particular detection range, range resolution, or doppler sensitivity for detecting one or more characteristics the user or one or more actions performed by the user.

The power amplifier 308 amplifies the frequency-modulated radar signal 324 for transmission via the transmit antenna 320. The transmitted frequency-modulated radar signal 324 is represented by a radar transmit signal 326. At least a portion of the radar transmit signal 326 is reflected by an object (e.g., the user). This reflected portion represents a radar receive signal 328. As depicted, an amplitude of the radar receive signal 328 is smaller than an amplitude of the radar transmit signal 326 due to losses incurred during propagation and reflection.

At the radar front-end circuit 210, the radar receive signal 328 represents a delayed version of the radar transmit signal 326. The amount of delay is proportional to a slant range (e.g., distance) from the radar front-end circuit 210 to the user. In particular, this delay represents a summation of a time it takes for the radar transmit signal 326 to propagate from the radar front-end circuit 210 to the object and a time it takes for the radar receive signal 328 to propagate from the object to the radar front-end circuit 210. If the object and/or the radar front-end circuit 210 is moving, the radar receive signal 328 is shifted in frequency relative to the radar transmit signal 326 due to the Doppler effect. In other words, characteristics of the radar receive signal 328 are dependent upon motion of the object and/or motion of the radar front-end circuit 210. Similar to the radar transmit signal 326, the radar receive signal 328 is composed of one or more of chirps.

During reception, the radar front-end circuit 210 receives and processes the radar receive signal 328. In particular, each receive antenna 322-1 to 322-M receives a version of the radar receive signal 328-1 to 328-M. In general, relative phase differences between these versions of the radar receive signals 328-1 to 328-M are due to differences in locations of the receive antennas 322-1 to 322-M. Within each receive channel 310-1 to 310-M, the low-noise amplifier 312 amplifies the radar receive signal 328, and the mixer 314 mixes the amplified radar receive signal 328 with the frequency-modulated radar signal 324. In particular, the mixer 314 performs a beating operation, which downconverts and demodulates the radar receive signal 328 using the frequency-modulated radar signal 324 to generate a beat signal 330.

A frequency of the beat signal 330 represents a frequency difference between the frequency-modulated radar signal 324 and the radar receive signal 328, which is proportional to the slant range to the object. Although not shown, the beat signal 330 can include multiple frequencies, which represents reflections from different portions of the object (e.g., different fingers of a user, different portions of a user's hand, or different body parts of a user). In some cases, these different portions move at different speeds, move in different directions, or are positioned at different slant ranges relative to the radar front-end circuit 210.

The filter 316 filters the beat signal 330, and the analog-to-digital converter 318 digitizes the filtered beat signal 330. The receive channels 310-1 to 310-M respectively generate digital beat signals 332-1 to 332-M, which are provided to the system processor 216 for processing. The receive channels 310-1 to 310-M of the transceiver 214 are coupled to the system processor 216, as further described with respect to FIG. 5. Multiple radar front-end circuits 210 are implemented within the user device 104, as further described with respect to FIG. 4-1.

Figures 1, 4:
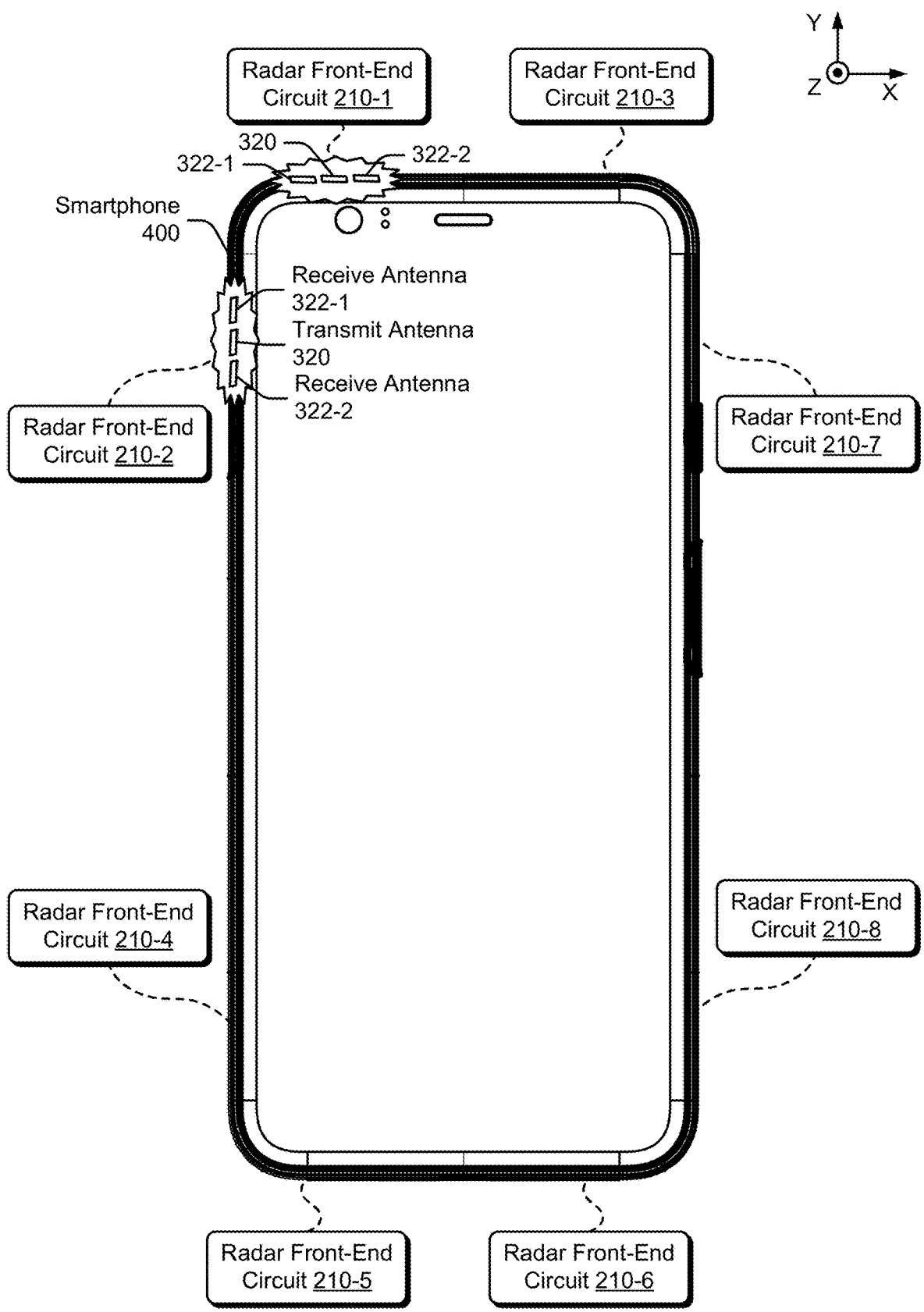
Figures 2, 4:
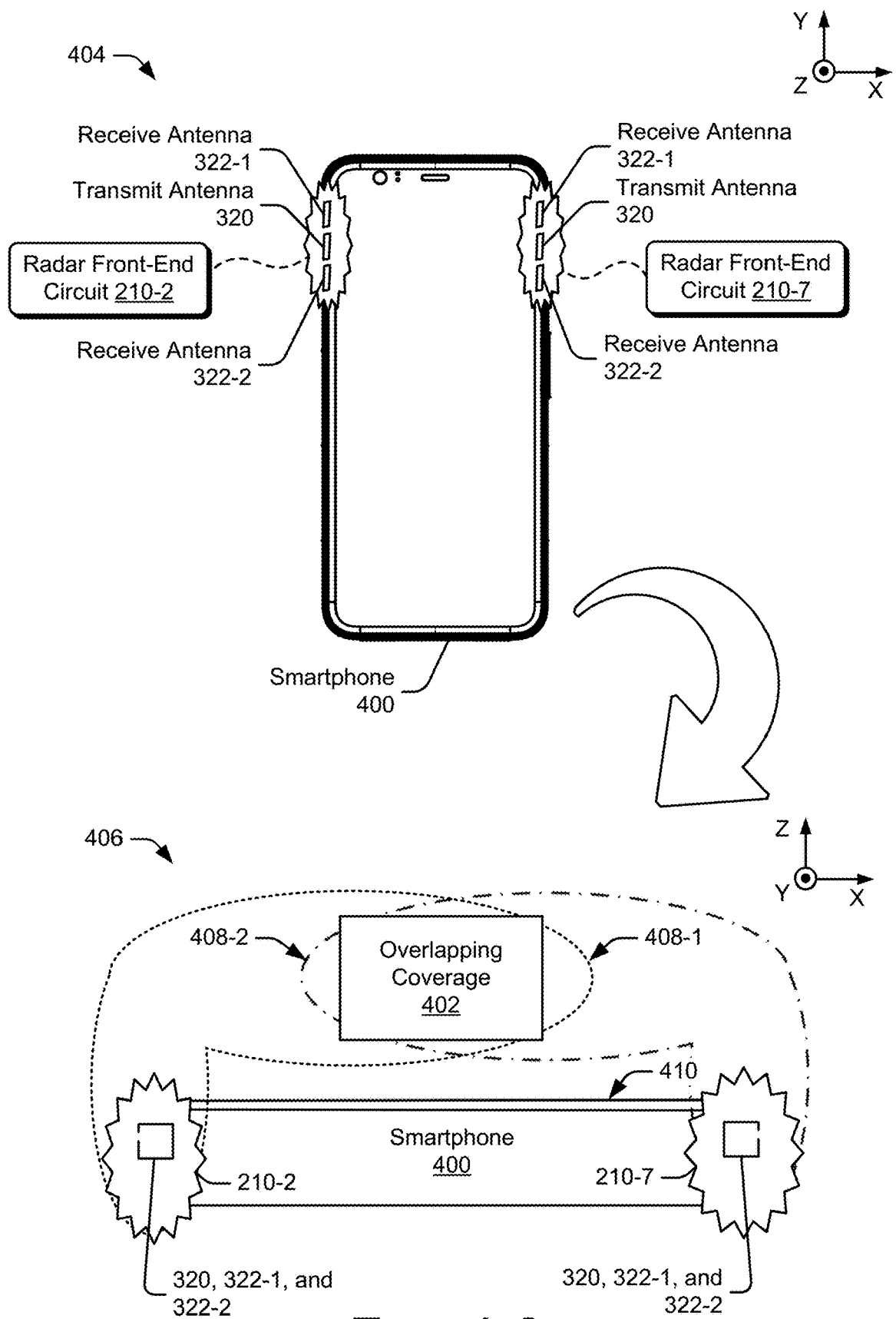

FIG. 4-1 illustrates example positions of the distributed radar system 102's radar front-end circuits 210 on a smartphone 400. In the depicted configuration, the smartphone 400 includes radar front-end circuits 210-1 to 210-8. In some implementations, the radar front-end circuits 210-1 to 210-8 are positioned within or under an exterior housing of the smartphone 400, which can be substantially transparent to radar signals (e.g., minimally attenuate radar signals). In some cases, a distance between a pair of radar front-end circuits 210-1 to 210-8 can be greater than half a wavelength associated with the radar transmit signals 326. Although not explicitly shown, sometimes the distances between the system processor 216 and two or more of the radar front-end circuits 210-1 to 210-8 varies.

The radar front-end circuits 210-1 to 210-8 are positioned around the smartphone 400 such that a portion of each radar front-end circuit 210's antenna pattern overlaps at least one other radar front-end circuit 210's antenna pattern. In this way, an object can be detected by two or more of the radar front-end circuits 210-1 to 210-8 at various locations around the smartphone 400.

The one or more antennas 212 of each radar front-end circuit 210 can face up along the Y axis towards an upper side of the smartphone 400, face left along the X axis towards a left side of the smartphone 400, face down along the Y axis towards a bottom side of the smartphone 400, or face right along the X axis towards a right side of the smartphone 400. For example, the antennas 212 of the radar front-end circuits 210-1 and 210-3 can face up along the Y axis, the antennas 212 of the radar front-end circuits 210-2 and 210-4 can face left along the X axis, the antennas 212 of the radar front-end circuits 210-5 and 210-6 can face down along the Y axis, and the antennas 212 of the radar front-end circuits 210-7 and 210-8 can face right along the X axis. In other implementations, the antennas 212 of one or more of the radar front-end circuits 210-1 to 210-8 can face up out of the page along the Z axis towards a front face of the smartphone 400 or face down into the page along the Z axis towards a back side of the smartphone 400.

Although the antennas 212 of the radar front-end circuits 210-1 to 210-8 can face a particular side of the smartphone 400, the antenna patterns of these antennas 212 can encompass a volume of space above the front face of the smartphone 400 and/or another volume of space behind the backside of the smartphone 400. In other words, the antenna patterns of these antennas 212 can expand beyond 180 degrees. In this way, the radar front-end circuits 210-1 to 210-8 can detect a user interacting with the smartphone 400.

Some positions within the smartphone 400 can be better for detecting certain types of gestures performed by the user. In particular, these positions can increase a radar front-end circuit 210's probability of detecting the user by increasing the radar front-end circuit 210's signal-to-noise ratio for detecting gestures within a particular region of interest in which the user is likely to perform gestures or interact with the smartphone 400. For example, some positions can increase the overlap between a radar front-end circuit 210's antenna pattern and the region of interest. The positions of the radar front-end circuits 210-5 and 210-6, for instance, can be better for detecting gestures performed near a bottom of the smartphone 400. This is because these positions place the radar front-end circuits 210-5 and 210-6 closer to the user as the user holds the smartphone 400 in the depicted portrait orientation. Alternatively, the radar front-end circuits 210-2 and 210-4 or the radar front-end circuits 210-7 and 210-8 can be better positioned for detecting gestures if the user holds the smartphone 400 in a landscape orientation (not shown).

In some implementations, the radar front-end circuits 210-1 to 210-8 have multiple antennas 212 that form an antenna array, such as multiple transmit antennas 320 or multiple receive antennas 322. Consider an example in which the radar front-end circuits 210-1 to 210-8 each include at least one transmit antenna 320 and at least two receive antennas 322-1 and 322-2, which form a linear antenna array. Orientations of these linear antenna arrays can vary across the radar front-end circuits 210-1 to 210-8 to enable the distributed radar system 102 to determine two-dimensional angular information associated with the user. In particular, orientations of some linear antenna arrays can differ by approximately 90 degrees. For example, the receive antennas 322-1 and 322-2 of the radar front-end circuit 210-1 can be aligned along the X axis to enable the distributed radar system 102 to measure azimuth and the receive antennas 322-1 and 322-2 of the radar front-end circuit 210-2 can be aligned along the Y axis to enable the distributed radar system 102 to measure elevation.

Although the smartphone 400 of FIG. 4-1 is shown to include eight radar front-end circuits 210-1 to 210-8, other implementations of the smartphone 400 can have fewer radar front-end circuits 210. For example, the smartphone 400 can include two radar front-end circuits 210, such as radar front-end circuits 210-1 and 210-2. In some cases, the two radar front-end circuits 210 are oriented along different axes to enable two-dimensional angular information to be measured.

FIG. 4-2 illustrates example overlapping coverage 402 of the distributed radar system 102's radar front-end circuits 210 on the smartphone 400. At 404, the smartphone 400 is shown to include the radar front-end circuits 210-2 and 210-7 of FIG. 4-1. In the depicted configuration, each of the radar front-end circuits 210-2 and 210-7 include a transmit antenna 320 and two receive antennas 322-1 and 322-2. The receive antennas 322-1 and 322-2 for each radar front-end circuit 210-2 and 210-7 form a linear array that is oriented along the Y axis.

At 406, the smartphone 400 is rotated to show an antenna pattern 408-1 of the radar front-end circuit 210-2 and an antenna pattern 408-2 of the radar front-end circuit 210-7. The antenna pattern 408-1 of the radar front-end circuit 210-2 covers a left side of the smartphone 400 and the antenna pattern 408-2 of the radar front-end circuit 210-7 covers a right side of the smartphone 400. Both the antenna patterns 408-1 and 408-2 cover a region above the smartphone 400's display 410 and overlap to provide overlapping coverage 402. In this way, both radar front-end circuits 210-2 and 210-7 can detect the same object or portion of the user that is within the overlapping coverage 402. Although not shown, the overlapping coverage 402 can be formed with other combinations of radar front-end circuits 210. For example, the radar front-end circuits 210-1 and 210-2 can also provide overlapping coverage 402 to enable two-dimensional angular information about the object within the overlapping coverage 402. In some cases, more than two radar front-end circuits 210 can provide the overlapping coverage 402.

The positioning of multiple radar front-end circuits 210 around the smartphone 400 can lead to several challenges. For example, it can be difficult to maintain phase synchronization across the radar front-end circuits 210, especially for millimeter-wave signals, without significantly increasing cost. This problem is exacerbated by the potentially long and various distances between different radar front-end circuits 210 and the system processor 216. The absence of phase synchronization causes the phases of the frequency-modulated radar signals 324 generated by the radar front-end circuits 210 to be independent and variable across the radar front-end circuits 210. The radar data combiner 220, however, can overcome this challenge and enable information from the radar front-end circuits 210 to be coherently combined, as further described with respect to FIG. 5.

Figure 5:
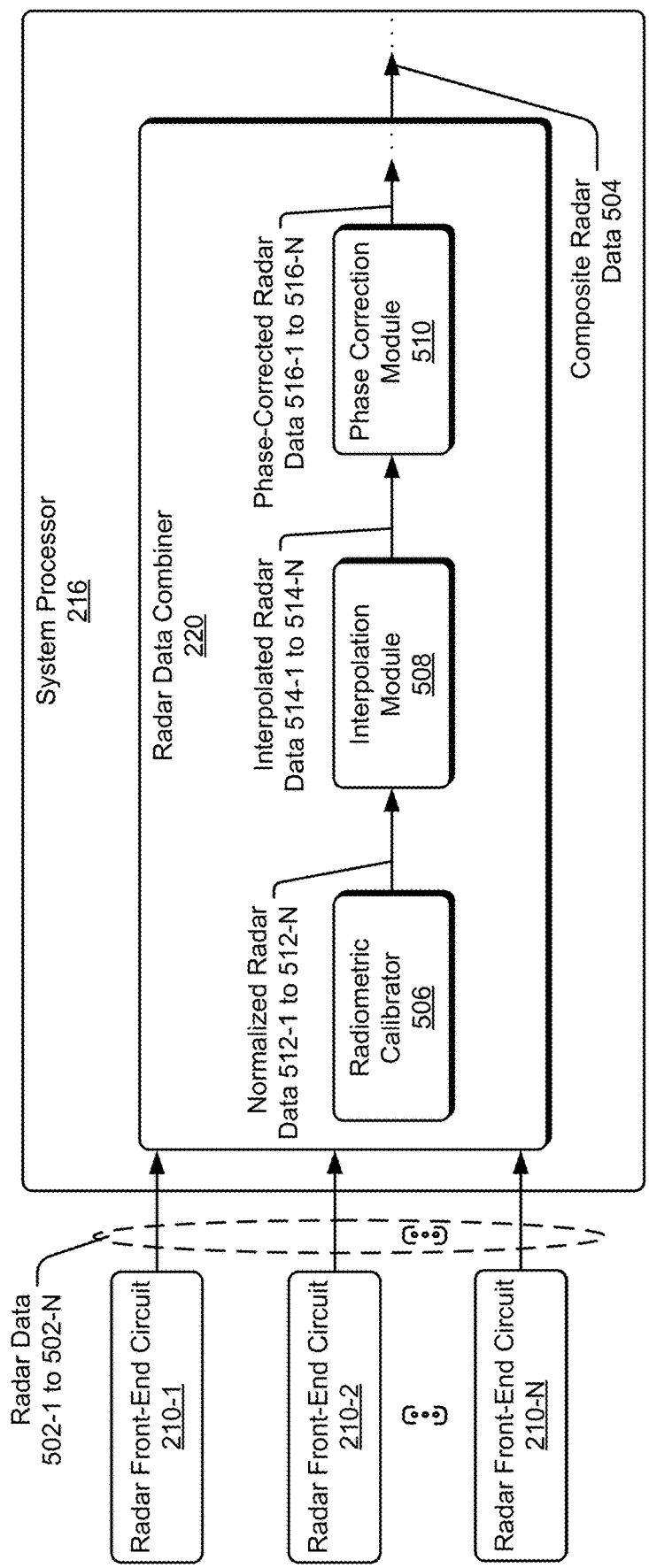
FIG. 5 illustrates an example scheme implemented by a processor of a distributed radar system.

FIG. 5 illustrates an example scheme implemented by the system processor 216 of the distributed radar system 102. In the depicted configuration, the system processor 216 is coupled to the radar front-end circuits 210-1 to 210-N. The radar front-end circuits 210-1 to 210-N provide radar data 502-1 to 502-N to the system processor 216. The radar data 502-1 to 502-N can include raw samples of the radar receive signals 328-1 to 328-M, such as samples of the digital beat signals 332-1 to 332-M of FIG. 3. In this case, the system processor 216 can perform Fourier Transform operations to generate range-Doppler maps based on the digital beat signals 332-1 to 332-M. In other implementations in which the radar front-end circuits 210-1 to 210-N include a processor, the range-Doppler maps can be generated by the processor and provided to the system processor 216 as the radar data 502-1 to 502-N.

During operation, the radar data combiner 220 accepts the radar data 502-1 to 502-N, combines the radar data 502-1 to 502-N together, and generates composite radar data 504. The composite radar data 504 can be provided to other modules implemented by the system processor 216, such as a tracking module, an angle-estimation module, a gesture-recognition module, a vital-sign detection module, and so forth.

The radar data combiner 220 includes a radiometric calibrator 506, an interpolation module 508, and a phase correction module 510. The radiometric calibrator 506 normalizes the radar data 502-1 to 502-N to compensate for antenna pattern differences between the radar front-end circuits 210-1 to 210-N. In particular, the radiometric calibrator 506 can compensate for differences in antenna gain, transmit power levels, receive gain, or noise figure across the radar front-end circuits 210-1 to 210-N. The radiometric calibrator 506 normalizes amplitudes within the range-Doppler maps based on a measured radar-cross-section (RCS) of a detected object. In some cases, the scaling weights for normalizing the amplitudes for different radar front-end circuits 210-1 to 210-N can be pre-determined or initialized based on measured performance differences of the radar front-end circuits 210-1 to 210-N. The radiometric calibrator 506 generates the normalized radar data 512-1 to 512-N, which is provided to the interpolation module 508.

The interpolation module 508 interpolates the normalized radar data 512-1 to 512-N to a common grid, such as a center of the smartphone 400 (of FIG. 4-1 or 4-2). To do this, the interpolation module 508 can perform various operations, such as a rotation operation and/or a translation operation. By interpolating to a common grid, the interpolation module 508 can compensate for differences (e.g., offsets) in the normalized radar data 512-1 to 512-N caused by differences in the positions of the radar front-end circuits 210-1 to 210-N. In one aspect, the interpolation module 508 can perform the translation and rotation in range using the range-Doppler maps. In another aspect, the interpolation module 508 can perform a co-registration operation, which aligns range bins of the range-Doppler maps to range bins associated with a reference range-Doppler map. The co-registration operation is further described with respect to FIG. 6.

Figure 6:
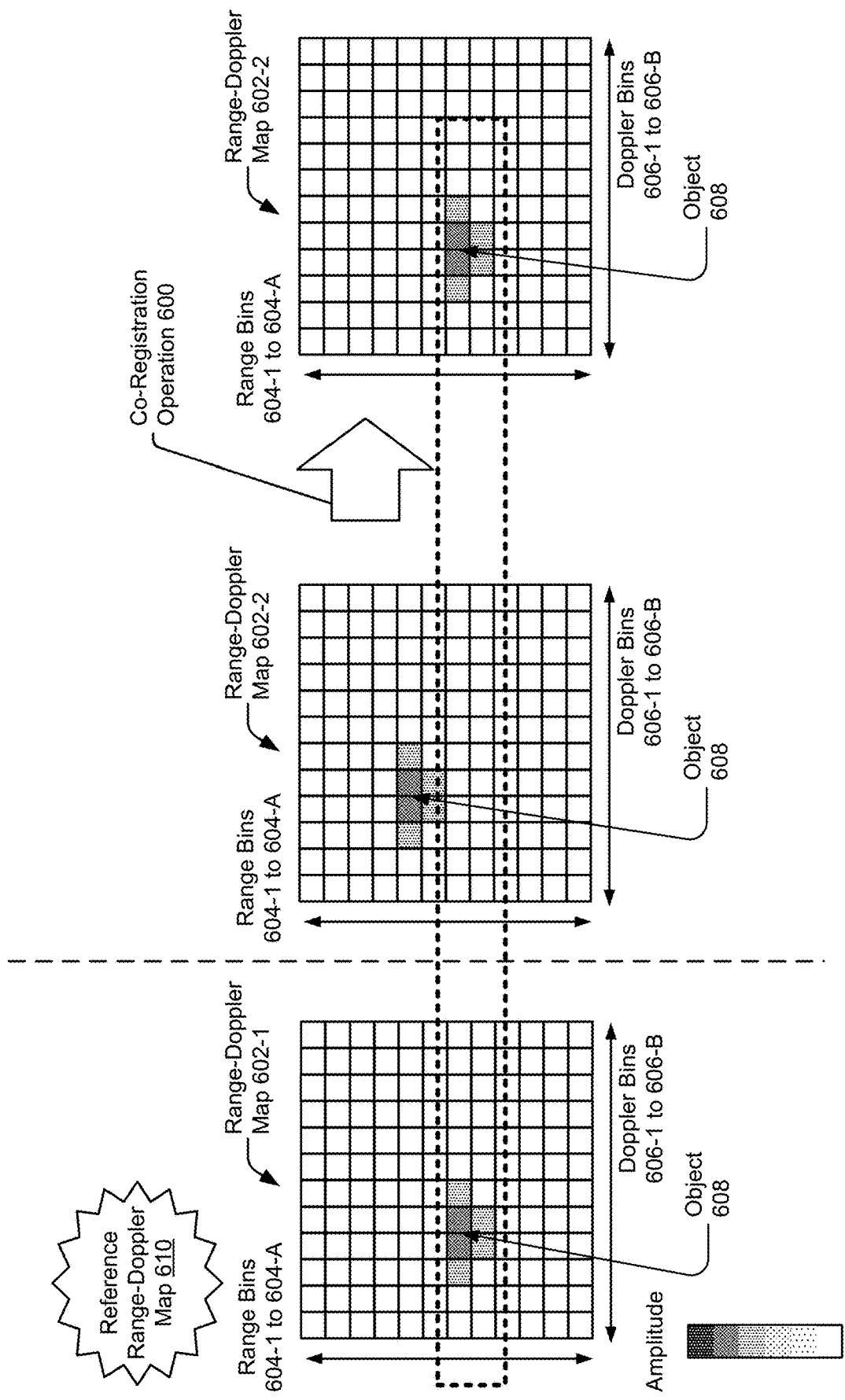
FIG. 6 illustrates an example co-registration operation performed by a distributed radar system.

FIG. 6 illustrates an example co-registration operation 600 performed by the distributed radar system 102. In particular, the interpolation module 508 accepts range-Doppler maps 602-1 and 602-2, which represent a portion of the normalized radar data 512-1 to 512-N. The range-Doppler map 602-1 is derived from the radar data 502-1 associated with the radar front-end circuit 210-1. The range-Doppler map 602-2 is derived from the radar data 502-2 associated with the radar front-end circuit 210-2. The range-Doppler maps 602-1 and 602-2 include amplitude information for range bins 604-1 to 604-A and Doppler bins 606-1 to 606-B, where A and B represent positive integers. Larger amplitudes are represented with patterns that have a larger percentage of black. Smaller amplitudes are represented with patterns that have a smaller percentage of black (e.g., a higher percentage of white). Although not explicitly shown, the range-Doppler maps 602-1 and 602-2 can also include phase information.

Each range bin 604 and Doppler bin 606 contains amplitude information for a particular range interval (e.g., slant-range interval or distance interval) and Doppler frequency interval. Both of the range-Doppler maps 602-1 and 602-2 include amplitude information associated with an object 608 (e.g., an appendage of a user or an inanimate object held by the user). In this case, the object 608 appears at similar Doppler bins 606 within the range-Doppler maps 602-1 and 602-2. However, due to the different positions of the radar front-end circuits 210-1 and 210-2, the object 608 appears at different range bins 604 within the range-Doppler maps 602-1 and 602-2. For example, the object 608 appears at a range bin associated with a farther distance within the range-Doppler map 602-2 compared to the range-Doppler map 602-1.

The interpolation module 508 performs the co-registration operation to align the range-Doppler maps 602-1 and 602-2 across the range dimension. In some implementations, the interpolation module 508 can assign one of the range-Doppler maps 602-1 or 602-2 as a reference range-Doppler map 610. In this case, the range-Doppler map 602-1 acts as the reference range-Doppler map 610. As such, the interpolation module 508 causes the range-Doppler map 602-2 associated with the radar front-end circuit 210-2 to have a detection at a range bin 604 that represents a same range as a related detection within the reference range-Doppler map 610 associated with the radar front-end circuit 210-1. In other words, the interpolation module 508 shifts the range-Doppler map 602-2 in range. For example, the interpolation module 508 shifts the amplitude information within the range-Doppler map 602-2 down two range bins 604 to align the range Doppler map 602-2 with the reference range-Doppler map 610. As a result, the amplitude information associated with the object 608 appears at the same range bin 604 within both the range-Doppler map 602-1 and the shifted range-Doppler map 602-2.

The interpolation module 508 can use zero padding or interpolation to populate information for the range bins 604 that were affected by the shift. Example interpolations can employ a cubic spline or a weighted sinc function.

Returning to FIG. 5, the interpolation module 508 generates interpolated radar data 514-1 to 514-N. As an example, the interpolated radar data 514-1 to 514-N can include the reference range-Doppler map 610 and the shifted range-Doppler map 602-2 of FIG. 6. The interpolation module 508 provides the interpolated radar data 514-1 to 514-N to the phase correction module 510.

The phase correction module 510 compensates for phase differences across the radar front-end circuit 210-1 to 210-N to enable the interpolated radar data 514-1 to 514-N to be combined coherently. In particular, the phase correction module 510 estimates a random phase term for each radar front-end circuit 210-1 to 210-N based on its position, as described in Equation 1:

$$\gamma_m = \varphi_{n,m} + \frac{4\pi}{\lambda} R'_{n,m} \qquad \text{Equation 1}$$

where $\gamma_m$ represents the random phase term, $\varphi_{n,m}$ represents a measured phase of the $N^{th}$ radar front-end circuit 210 and the $M^{th}$ receive channel 310, $\lambda$ represents the wavelength of the radar transmit signal 326, and $R'_{n,m}$ represents an estimated range of the object 608 based on radar data 502 provided by the $N^{th}$ radar front-end circuit 210 and the $M^{th}$ receive channel 310. For simplicity, the factor $$\frac{4\pi}{\lambda}$$

assumes the transmission and reception of the radar signals 326 and 328 occur at a same position (e.g., using a same antenna 212). Other equations can be used to account for the transmission and reception occurring at different positions (e.g., using different antennas 212). The phase correction module 510 removes the estimated random phase term within the interpolated radar data 514-1 to 514-N. For example, the phase correction module 510 can adjust (e.g., increase or decrease) the phases within each cell of the range-Doppler maps (e.g., range-Doppler maps 602-1 and 602-2) by the estimated random phase term.

In some implementations, the phase correction module 510 removes the random phase term for each radar front-end circuit 210-1 to 210-N by generating interferograms for different receive channels 310-1 to 310-M of each radar front-end circuit 210 and combining pairs of the interferograms using a subtraction operation to remove the random phase term that similarly affects the combined interferograms.

In general, the radar data combiner 220 can implement various combinations of the radiometric calibrator 506, the interpolation module 508, and the phase correction module 510. For example, some implementations of the radar data combiner 220 includes the interpolation module 508 and the phase correction module 510, but does not include the radiometric calibrator 506 to reduce complexity. Other implementations of the radar data combiner 220 includes the radiometric calibrator 506 and/or the interpolation module 508, but does not include the phase correction module 510.

In this case, the interpolated radar data 514-1 to 514-N is combined in a non-coherent manner.

The radar data combiner 220 combines the phase-corrected radar data 516-1 to 516-N together to generate the composite radar data 504. In particular, the radar data combiner 220 can superimpose range-Doppler maps 602 associated with different radar front-end circuits 210-1 to 210-N to generate the composite radar data 504. The composite radar data 504 can include multiple range-Doppler maps 602 associated with different receive channels 310 to enable digital beamforming. The composite radar data 504 can be used by other modules implemented by the system processor 216 or applications implemented by the computer processor 202.

Example Method

Figure 7:
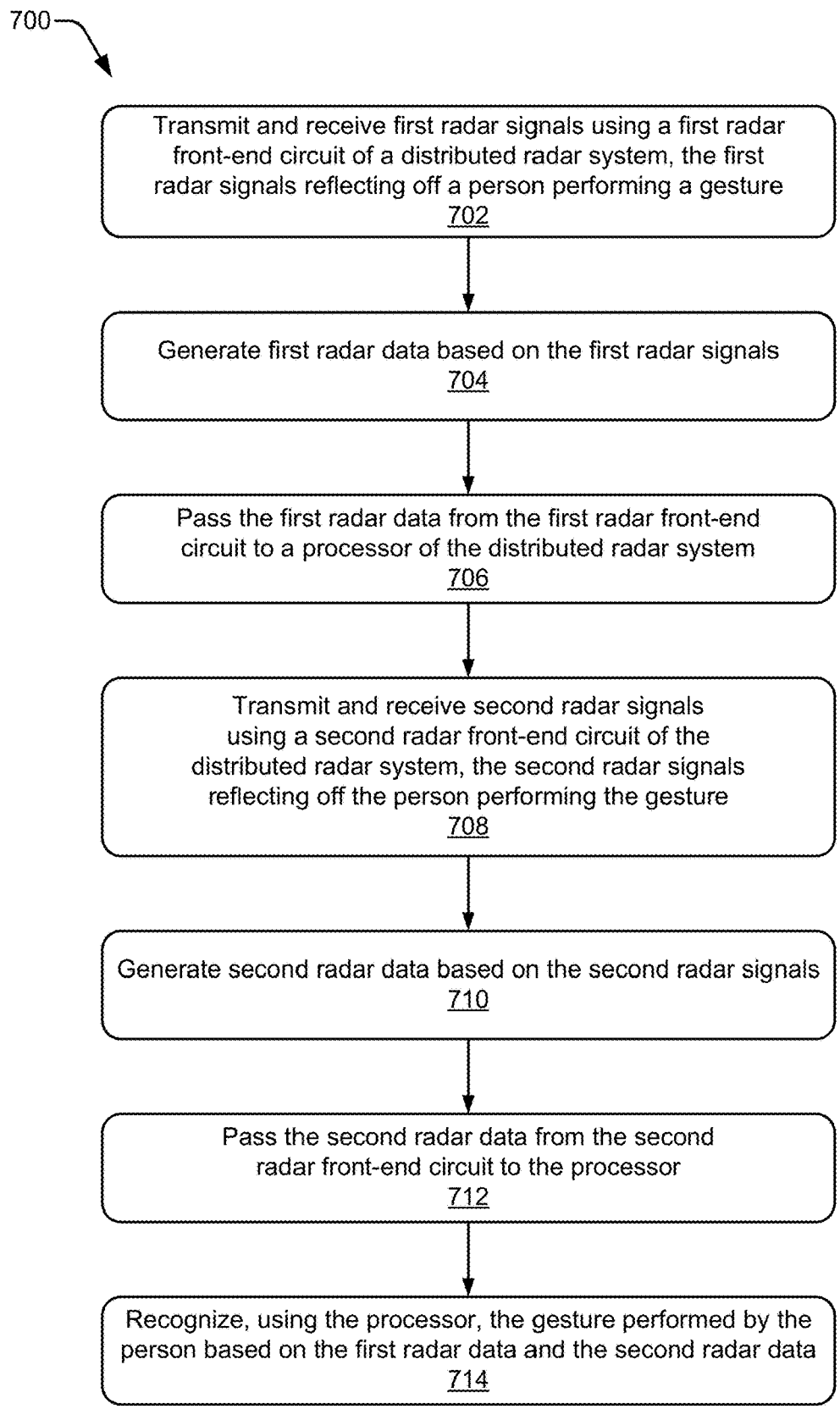
FIG. 7 illustrates an example method for performing operations of a distributed radar system.

FIG. 7 depicts an example method 700 for performing operations of the distributed radar system 102. Method 700 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-6 of FIG. 1, and entities detailed in FIGS. 2-5, reference to which is made for example only. The techniques are not limited to performance by one entity or multiple entities operating on one device.

At 702, first radar signals are transmitted and received using a first radar front-end circuit of a distributed radar system. The first radar signals reflect off a person performing a gesture. For example, the first radar front-end circuit 210-1 of the distributed radar system 102 transmits radar transmit signals 326 and receives radar receive signals 328, as shown in FIG. 3. The radar transmit signals 326 reflect off a person performing a gesture. The gesture can include any of the gestures described above with respect to FIG. 1.

At 704, first radar data is generated based on the first radar signals. For example, the radar front-end circuit 210-1 generates the radar data 502-1 based on one or more radar receive signals 328 that are received by the radar front-end circuit 210-1. The radar data 502-1 can include samples of one or more digital beat signals 332.

At 706, the first radar data is passed from the first radar front-end circuit to a processor of the distributed radar system. For example, the radar front-end circuit 210-1 passes the radar data 502-1 to the system processor 216, as shown in FIG. 5. The distributed radar system 102 can include wiring or electrical connections to pass the radar data 502-1 from the radar front-end circuit 210-1 to the system processor 216.

At 708, second radar signals are transmitted and received using a second radar front-end circuit of the distributed radar system. The second radar signals reflect off the person performing the gesture. For example, the second radar front-end circuit 210-2 of the distributed radar system 102 transmits radar transmit signals 326 and receives radar receive signals 328, as shown in FIG. 3. The radar transmit signals 326 reflect off the person performing the gesture. The first radar front-end circuit 210-1 and second radar front-end circuit 210-2 can provide overlapping coverage 402 for detecting the person performing the gesture, as described with respect to FIG. 4-2.

At 710, second radar data is generated based on the second radar signals. For example, the radar front-end circuit 210-2 generates the radar data 502-2 based on one or more radar receive signals 328 that are received by the radar front-end circuit 210-2. The radar data 502-2 can include samples of one or more digital beat signals 332.

At 712, the second radar data is passed from the second radar front-end circuit to the processor. For example, the radar front-end circuit 210-2 passes the radar data 502-2 to the system processor 216, as shown in FIG. 5. The distributed radar system 102 can include wiring or electrical connections to pass the radar data 502-2 from the radar front-end circuit 210-2 to the system processor 216.

At 714, the gesture performed by the person is recognized using the processor and based on the first radar data and the second radar data. For example, the system processor 216 recognizes the gesture performed by the person based on the radar data 502-1 and 502-2. To recognize the gesture, the system processor 216 uses the radar data combiner 220 to coherently or non-coherently combine the radar data 502-1 and 502-2 together to generate the composite radar data 504. In some implementations, the radar data combiner 220 normalizes the radar data 502-1 and 502-2, interpolates the radar data 502-1 and/or 502-2 to a common grid, and/or compensates for phase differences between the radar front-end circuits 210-1 and 210-2 to enable coherent combination of the radar data 502-1 and 502-2, as described with respect to FIGS. 5 and 6.

Example Computing System

Figure 8:
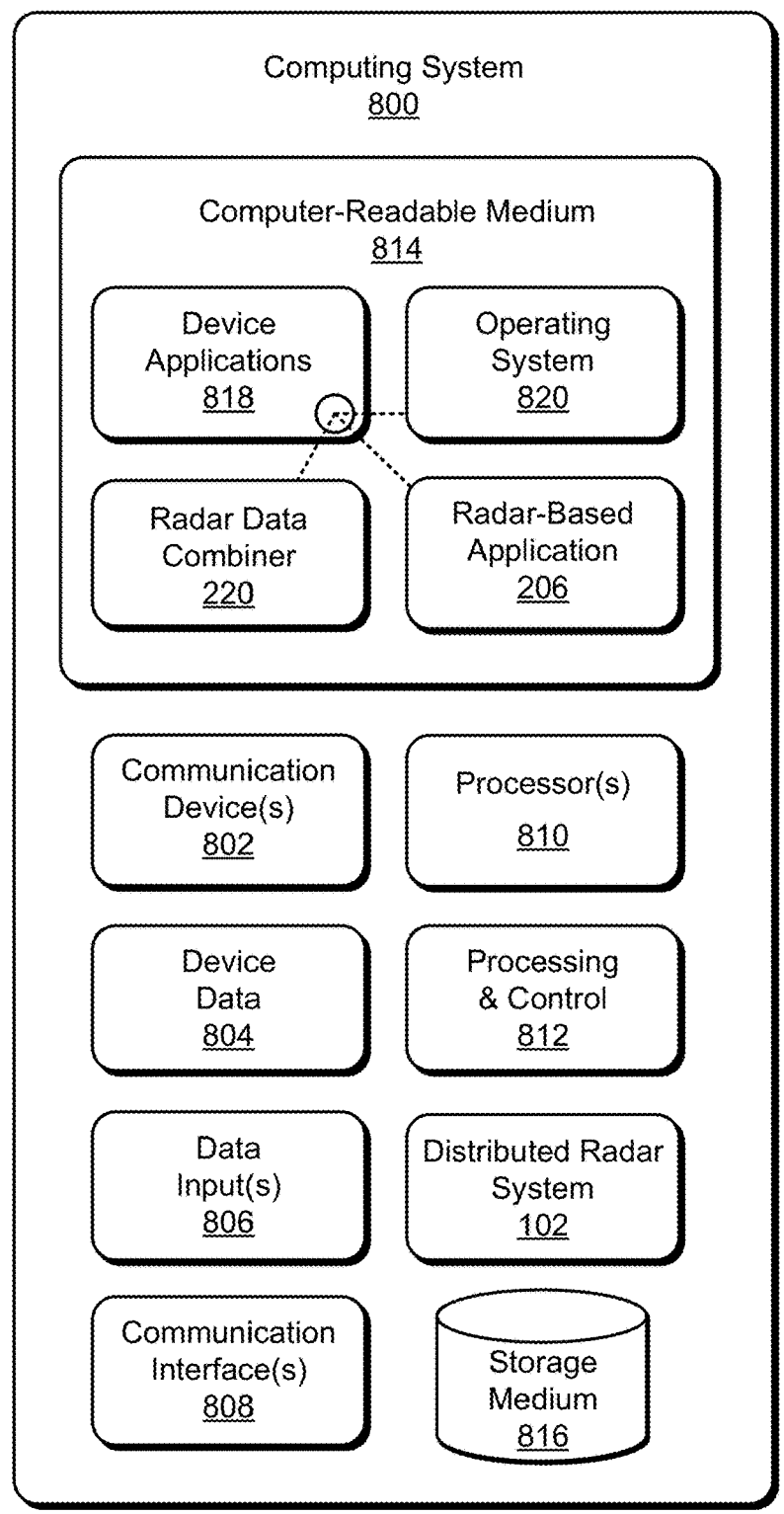
FIG. 8 illustrates an example computing system embodying, or in which techniques may be implemented that enable use of, a distributed radar system.

FIG. 8 illustrates various components of an example computing system 800 that can be implemented as any type of client, server, and/or computing device as described with reference to the previous FIG. 2 to implement a distributed radar system 102.

The computing system 800 includes communication devices 802 that enable wired and/or wireless communication of device data 804 (e.g., received data, data that is being received, data scheduled for broadcast, or data packets of the data). The communication devices 802 or the computing system 800 can include one or more distributed radar systems 102. The device data 804 or other device content can include configuration settings of the device, media content stored on the device, and/or information associated with a user of the device. Media content stored on the computing system 800 can include any type of audio, video, and/or image data. The computing system 800 includes one or more data inputs 806 via which any type of data, media content, and/or inputs can be received, such as human utterances, user-selectable inputs (explicit or implicit), messages, music, television media content, recorded video content, and any other type of audio, video, and/or image data received from any content and/or data source.

The computing system 800 also includes communication interfaces 808, which can be implemented as any one or more of a serial and/or parallel interface, a wireless interface, any type of network interface, a modem, and as any other type of communication interface. The communication interfaces 808 provide a connection and/or communication links between the computing system 800 and a communication network by which other electronic, computing, and communication devices communicate data with the computing system 800.

The computing system 800 includes one or more processors 810 (e.g., any of microprocessors, controllers, and the like), which process various computer-executable instructions to control the operation of the computing system 800 and to enable techniques for, or in which can be embodied, radar sensing. Alternatively or in addition, the computing system 800 can be implemented with any one or combination of hardware, firmware, or fixed logic circuitry that is implemented in connection with processing and control circuits which are generally identified at 812. Although not shown, the computing system 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 800 also includes a computer-readable media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 800 can also include a mass storage media device (storage media) 816.

The computer-readable media 814 provides data storage mechanisms to store the device data #04, as well as various device applications 818 and any other types of information and/or data related to operational aspects of the computing system 800. For example, an operating system 820 can be maintained as a computer application with the computer-readable media 814 and executed on the processors 810. The device applications 818 may include a device manager, such as any form of a control application, software application, signal-processing and control module, code that is native to a particular device, a hardware abstraction layer for a particular device, and so on.

The device applications 818 also include any system components, engines, or managers to implement the distributed radar system 102. In this example, the device applications 818 includes the radar-based application 206 and the radar data combiner 220 of FIG. 2.

Conclusion

Although techniques using, and apparatuses including, a distributed radar system have been described in language specific to features, it is to be understood that the subject of the appended claims is not necessarily limited to the specific features. Rather, the specific features are disclosed as example implementations of a distributed radar system.

Some examples are described below.

Example 1: An apparatus comprising:
a distributed radar system comprising:
two or more radar front-end circuits, each radar front-end circuit of the two or more radar front-end circuits comprising:
at least one antenna; and
at least one transceiver coupled to the at least one antenna; and
at least one processor coupled to the two or more radar front-end circuits.

Example 2: The apparatus of example 0, wherein:
at least two radar front-end circuits of the two or more radar front-end circuits are configured to transmit signals having a wavelength; and
the at least two radar front-end circuits are separated by a distance that is greater than half the wavelength.

Example 3: The apparatus of example 0 or 0, wherein at least two other radar front-end circuits of the two or more radar front-end circuits are placed at different distances from the at least one processor.

Example 4: The apparatus of any preceding example, wherein each radar front-end circuit of the two or more radar front-end circuits comprises an integrated circuit, the integrated circuit comprising the at least one antenna and the at least one transceiver.

Example 5: The apparatus of any preceding example, wherein the two or more radar front-end circuits comprise:
a first radar front-end circuit configured to have a first antenna pattern; and
a second radar front-end circuit configured to have a second antenna pattern that at least partially overlaps the first antenna pattern.

Example 6: The apparatus of example 0, wherein:
the first radar front-end circuit is configured to transmit a first radar transmit signal having a first phase; and
the second radar front-end circuit is configured to transmit a second radar transmit signal having a second phase that is different than the first phase.

Example 7: The apparatus of any preceding example, wherein the two or more radar front-end circuits are jointly configured to be synchronized in time.

Example 8: The apparatus of any preceding example, wherein the at least one antenna of each of the two or more radar front-end circuits comprises:
at least one transmit antenna; and
at least two receive antennas forming a linear antenna array.

Example 9: The apparatus of example 0, wherein linear antenna arrays of at least two radar front-end circuits of the two or more radar front-end circuits are oriented 90 degrees with respect to each other.

Example 10: The apparatus of any preceding example, wherein:
the two or more radar front-end circuits are configured to generate respective radar data; and
the at least one processor is configured to coherently or non-coherently combine the respective radar data to generate composite radar data.

Example 11: The apparatus of example 0, wherein the at least one processor is configured to normalize, prior to generating the composite radar data, the respective radar data based on performance differences between the two or more radar front-end circuits.

Example 12: The apparatus of example 0, wherein the at least one processor is configured to interpolate, prior to generating the composite radar data, the respective radar data to a common grid based on differences in relative positions of the two or more radar front-end circuits with respect to the common grid.

Example 13: The apparatus of example 0, wherein the at least one processor is configured to apply, prior to generating the composite radar data, phase corrections to the respective radar data to compensate for phase differences between the two or more radar front-end circuits.

Example 14: A method for operating a distributed radar system, the method comprising:
transmitting and receiving first radar signals using a first radar front-end circuit of the distributed radar system, the first radar signals reflecting off a person performing a gesture;
generating first radar data based on the first radar signals;
passing the first radar data from the first radar front-end circuit to a processor of the distributed radar system;
transmitting and receiving second radar signals using a second radar front-end circuit of the distributed radar system, the second radar signals reflecting off the person performing the gesture;
generating second radar data based on the second radar signals;
passing the second radar data from the second radar front-end circuit to the processor; and
recognizing, using the processor, the gesture performed by the person based on the first radar data and the second radar data.

Example 15: The method of example 0, further comprising:
generating composite radar data by combining the first radar data and the second radar data together coherently or non-coherently.

Example 16: The method of example 0, further comprising one or more of the following:
normalizing, prior to generating the composite radar data, the first radar data and the second radar data based on performance differences between the first radar front-end circuit and the second radar front-end circuit;
interpolating, prior to generating the composite radar data, at least one of the first radar data or the second radar data to a common grid based on differences in relative positions of the first radar front-end circuit or the second radar front-end circuit with respect to the common grid; or
applying, prior to generating the composite radar data, phase corrections to at least one of the first radar data or the second radar data to compensate for a phase difference between the first radar front-end circuit and the second radar front-end circuit.

Example 17: The method of any one of examples 0-0, further comprising:
synchronizing operations of the first radar front-end circuit and the second radar front-end circuit in time.

Example 18: A computer-readable storage medium comprising instructions that, responsive to execution by a processor, cause the distributed radar system to perform any one of the methods of examples 0-0.

The invention claimed is:

1. A smartphone comprising:
a distributed radar system comprising:
two or more radar front-end circuits implemented on different integrated circuits, each radar front-end circuit of the two or more radar front-end circuits comprising:
at least one antenna; and
at least one transceiver coupled to the at least one antenna, the at least one transceiver comprising at least one transmitter and at least one receiver; and
at least one processor coupled to the two or more radar front-end circuits, the at least one processor being separate from the different integrated circuits of the two or more radar front-end circuits, wherein:
at least two radar front-end circuits of the two or more radar front-end circuits are configured to transmit signals having a wavelength; and
the at least two radar front-end circuits are separated by a distance that is greater than half the wavelength.

2. The smartphone of claim 1, wherein the at least two radar front-end circuits are placed at different distances from the at least one processor.

3. The smartphone of claim 1, wherein the two or more radar front-end circuits comprise:
a first radar front-end circuit configured to have a first antenna pattern; and
a second radar front-end circuit configured to have a second antenna pattern that at least partially overlaps the first antenna pattern.

4. The smartphone of claim 3, wherein:
the first radar front-end circuit is configured to transmit a first radar transmit signal having a first phase; and
the second radar front-end circuit is configured to transmit a second radar transmit signal having a second phase that is different than the first phase.

5. The smartphone of claim 1, wherein the two or more radar front-end circuits are jointly configured to be synchronized in time.

6. The smartphone of claim 1, wherein the at least one antenna of each of the two or more radar front-end circuits comprises:
at least one transmit antenna coupled to the at least one transmitter; and
at least two receive antennas forming a linear antenna array, the at least two receive antennas coupled to the at least one receiver.

7. The smartphone of claim 6, wherein linear antenna arrays of at least two radar front-end circuits of the two or more radar front-end circuits are oriented 90 degrees with respect to each other.

8. The smartphone of claim 1, wherein:
the two or more radar front-end circuits are configured to generate respective radar data; and
the at least one processor is configured to coherently or non-coherently combine the respective radar data to generate composite radar data.

9. The smartphone of claim 8, wherein the at least one processor is configured to normalize, prior to generating the composite radar data, the respective radar data based on performance differences between the two or more radar front-end circuits.

10. The smartphone of claim 8, wherein the at least one processor is configured to interpolate, prior to generating the composite radar data, the respective radar data to a common grid based on differences in relative positions of the two or more radar front-end circuits with respect to the common grid.

11. The smartphone of claim 8, wherein the at least one processor is configured to apply, prior to generating the composite radar data, phase corrections to the respective radar data to compensate for phase differences between the two or more radar front-end circuits.

12. A method for operating a distributed radar system of a smartphone, the method comprising:
transmitting and receiving first radar signals using a first radar front-end circuit of the distributed radar system, the first radar signals reflecting off a person performing a gesture;
generating first radar data based on the first radar signals;
passing the first radar data from the first radar front-end circuit to a processor of the distributed radar system;
transmitting and receiving second radar signals using a second radar front-end circuit of the distributed radar system, the second radar signals reflecting off the person performing the gesture, the first and second radar front-end circuits implemented on different integrated circuits that are separated by a distance that is greater than a wavelength of the first and second radar signals;
generating second radar data based on the second radar signals;
passing the second radar data from the second radar front-end circuit to the processor; and
recognizing, using the processor, the gesture performed by the person based on the first radar data and the second radar data, the processor being separate from the different integrated circuits of the first and second radar front-end circuits.

13. The method of claim 12, further comprising:
generating composite radar data by combining the first radar data and the second radar data together coherently or non-coherently.

14. The method of claim 13, further comprising one or more of the following:
normalizing, prior to generating the composite radar data, the first radar data and the second radar data based on performance differences between the first radar front-end circuit and the second radar front-end circuit;
interpolating, prior to generating the composite radar data, at least one of the first radar data or the second radar data to a common grid based on differences in relative positions of the first radar front-end circuit or the second radar front-end circuit with respect to the common grid; or
applying, prior to generating the composite radar data, phase corrections to at least one of the first radar data or the second radar data to compensate for a phase difference between the first radar front-end circuit and the second radar front-end circuit.

15. The method of claim 12, further comprising:
synchronizing operations of the first radar front-end circuit and the second radar front-end circuit in time.

16. A non-transitory computer-readable storage medium comprising instructions that, responsive to execution by a processor, cause a distributed radar system of a smartphone to:
transmit and receive first radar signals using a first radar front-end circuit of the distributed radar system, the first radar signals reflecting off a person performing a gesture;
generate first radar data based on the first radar signals;
pass the first radar data from the first radar front-end circuit to a processor of the distributed radar system;
transmit and receive second radar signals using a second radar front-end circuit of the distributed radar system, the second radar signals reflecting off the person performing the gesture, the first and second radar front-end circuits implemented on different integrated circuits that are separated by a distance that is greater than a wavelength of the first and second radar signals;
generate second radar data based on the second radar signals;
pass the second radar data from the second radar front-end circuit to the processor; and
recognize, using the processor, the gesture performed by the person based on the first radar data and the second radar data, the processor being separate from the different integrated circuits of the first and second radar front-end circuits.

17. The non-transitory computer-readable storage medium of claim 16, wherein the non-transitory computer-readable storage medium is configured to cause the distributed radar system to:
generate composite radar data by combining the first radar data and the second radar data together coherently or non-coherently.

18. The non-transitory computer-readable storage medium of claim 16, wherein the non-transitory computer-readable storage medium is configured to cause the distributed radar system to:
synchronize operations of the first radar front-end circuit and the second radar front-end circuit in time.

19. The method of claim 12, wherein:
the transmitting of the first radar signals comprises transmitting the first radar signals using a first antenna pattern; and
the transmitting of the second radar signals comprises transmitting the second radar signals using a second antenna pattern that at least partially overlaps the first antenna pattern.

20. The non-transitory computer-readable storage medium of claim 16, wherein the non-transitory computer-readable storage medium is configured to cause the distributed radar system to:
transmit the first radar signals using a first antenna pattern associated with the first radar front-end circuit; and
transmit the second radar signals using a second antenna pattern associated with the second radar front-end circuit, the second antenna pattern at least partially overlapping the first antenna pattern.

\* \* \* \* \*